(12) United States Patent
Creel et al.

(10) Patent No.: US 7,346,533 B1
(45) Date of Patent: Mar. 18, 2008

(54) METHOD AND SYSTEM FOR UTILIZING BEST PRACTICES TO SATISFY REQUIREMENTS OF A REQUIREMENTS SPECIFICATION

(75) Inventors: Christopher Taylor Creel, Tampa, FL (US); Paul J. Stoker, Palm Harbor, FL (US)

(73) Assignee: Perot Systems Corporation, Plano, TX (US)

( * ) Notice: Subject to any disclaimer, the term of this patent is extended or adjusted under 35 U.S.C. 154(b) by 883 days.

(21) Appl. No.: 10/000,972

(22) Filed: Oct. 24, 2001

(51) Int. Cl.
*G06F 9/46* (2006.01)
(52) U.S. Cl. .............................................. 705/9; 705/7
(58) Field of Classification Search .................... 705/9, 705/7
See application file for complete search history.

(56) References Cited

U.S. PATENT DOCUMENTS

| | | | | |
|---|---|---|---|---|
| 5,875,431 A | * | 2/1999 | Heckman et al. | 705/7 |
| 5,903,453 A | * | 5/1999 | Stoddard, II | 700/79 |
| 6,397,202 B1 | * | 5/2002 | Higgins et al. | 706/47 |
| 6,715,130 B1 | * | 3/2004 | Eiche et al. | 715/514 |
| 6,801,818 B2 | * | 10/2004 | Kopcha | 700/97 |
| 6,862,585 B2 | * | 3/2005 | Planalp et al. | 707/1 |
| 6,961,713 B2 | * | 11/2005 | Perkowski | 705/27 |
| 2002/0069035 A1 | * | 6/2002 | Tracy et al. | 702/181 |
| 2002/0184071 A1 | * | 12/2002 | Bicknell et al. | 705/9 |
| 2004/0143470 A1 | * | 7/2004 | Myrick et al. | 705/7 |

FOREIGN PATENT DOCUMENTS

WO          WO9429804 A1 * 12/1994

OTHER PUBLICATIONS

"The House of Quality" by Joh Hauser and Don Clausing, Harvard Business Review, May-Jun. 1988.*
"Managing Software Requirements a Unified Approach" by Leffingwell et al, Addison Wesley Publishing, 2000.*
TBI.com web pages from Mar. 2000, Caliber-Requirements Management.*
"QSS Delivers Industry's First Enterprise-Wide Requirements Management Suite for E-Business", Mar. 22, 2000, retrieved from archive.org.*
"Manage your project requirements" by Fiebus, Information Week, Oct. 19, 1998.*
"Rational RequisitePro User's Guide version 4.5" by Rational unifying software teams, 1999.*
Collier et al "A Defined Process For Project Postmortem Review", Dec. 1999 IEEE Software, pp. 65-71.*
Stout Requirements Traceability abd the Effect on the System Development Lifecycle (SDLC), Dec. 1998, Systems Development Process, pp. 3-17.*

* cited by examiner

*Primary Examiner*—Romain Jeanty
(74) *Attorney, Agent, or Firm*—Winstead PC

(57) ABSTRACT

A method and system for developing a requirement specification by a consultant for a client. The method includes communication between the client and consultant to determine a set of engagement requirements that both the client and consultant deem to be important. A corresponding set of practices to be applied to the set of requirements is selected. An objective determination is made as to whether the set of practices satisfies the set of requirements in the context of the business environment of the client.

21 Claims, 4 Drawing Sheets

```
TRACEABILITY MATRIX

ENGAGEMENT      BEST
REQUIREMENT     PRACTICE
     .            .
     .            .
     .            .
  ┌──────────┬──────────┐
  │   2.2    │   17.A   │
  └──────────┴──────────┘
     .            .
     .            .
     .            .
```

METHOD AND SYSTEM FOR UTILIZING BEST PRACTICES TO SATISFY REQUIREMENTS OF A REQUIREMENTS SPECIFICATION

BACKGROUND

1. Field of the Invention

The principles of the present invention relate generally to project management, and, more particularly, but not by way of limitation, to utilizing best practices (solutions) to satisfy requirements (problems) of a requirements engagement.

2. Background of the Invention

Requirements engagements include an activity or group of activities that occur between consultants and clients that are used in the process of developing a requirements specification. A requirements specification includes requirements that define problems to be solved. Typically, the consultant has experience with solving engagement requirements that the client identifies to the consultant as being important in executing a successful engagement. In providing practices or solutions to be applied to the engagement requirements, the consultant uses practices known to the consultant to be applicable to satisfy the engagement requirements based on experience. In other words, the consultant typically uses a subjective standard to solve the problems of the client with respect to executing a successful requirements engagement. In fact, quite often the consultant tells a particular "war story" to add credibility to the practices that are being proposed to solve the problems. As understood in the art, practices may be any tool, technique, or process used to solve a problem. For example, one practice may be using a particular word processor, such as Microsoft Word®, or database, such as Oracle®, to solve the problem of electronic data storage.

One problem that exists with traditional consulting for clients having requirement engagements to be addressed is that the consultants typically force clients to use the practices that the consultant utilizes. The consultant does this because these are the particular reference engagement requirements from a conscious or unconscious list that the consultant qualitatively believes will ensure that a successful engagement is executed. Clients, too, utilize a conscious or unconscious list of reference engagement requirements that they qualitatively believe will ensure that a successful engagement is executed. Often, the consultant and the client are at odds because they disagree on the practices that best solve the underlying requirements of a successful engagement. While the consultant and client may differ concerning the underlying engagement requirements, the disagreement over the practices to address the engagement requirements is fundamentally a much larger issue and often becomes a major obstacle—even to the point of dissolving the relationship. Additionally, if during the process of executing the practices it is found that the practices are simply not satisfying the engagement requirements of the client or consultant, a change of the practices may not easily be made due to a lack of understanding of how changing one practice for another to solve one requirement affects other requirements that were relying on the original practice. If a change in practices occurs, the consultant may be unable to readily articulate to the client the ramifications of changing one practice for another, thereby leaving the client with an uninformed business decision to be made.

SUMMARY OF THE INVENTION

To overcome the problems of a consultant having (i) to subjectively determine processes to be utilized for requirements of a requirements engagement or specification, and (ii) to not be able to objectively determine ramifications of using one practice versus another practice, a best practices delivery system has been developed. The best practices delivery system may be utilized by a consultant to develop a requirements engagement to objectively apply best practices to engagement requirements requested by a client. Additionally, the best practices delivery system provides the consultant with an easy tool to replace one practice for another during execution of the requirements engagement and to identify ramifications the replacement has in meeting the engagement requirements, thereby allowing the client to make an informed business decision.

One embodiment for applying the principles of the present invention includes a method for developing a requirement specification by a consultant for a client. The method includes a communication between the client and consultant to determine a set of engagement requirements that both the client and the consultant deem to be important to a successful project. A corresponding set of practices to be applied to the set of requirements is selected. A determination is made as to whether the set of practices satisfies the set of engagement requirements in the context of the business environment of the client.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

The principles of the present invention will now be described more fully hereinafter with reference to the accompanying drawings, in which embodiments of the principles of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Consultants developing a requirements specification for a client to be used for a project have traditionally used experience to subjectively determine practices (solutions) that the client may use to solve requirements (problems) of a requirements engagement. A practice may be any tool, technique, or process used to solve a problem. A client, however, generally wants to use practices, such as a particular word processor or business process, which are deemed to be standard for the client. The consultant using experience as a guide for solving the client's problems may or may not know whether the client's practices satisfy particular engagement requirements. Additionally, if the consultant is not fully experienced with particular engagement requirements, properly advising the client as to whether a particular practice satisfies a requirement may not be possible.

The principles of the present invention are directed to a method and system for utilizing objective standards to determine that a practice satisfies engagement requirements for a client. In general, the consultant communicates with the client to determine a set of engagement requirements that are important to the client. A corresponding set of best practices, as determined by the consultant, to be applied to the set of engagement requirements is selected. A determination as to whether the set of best practices satisfies the set of engagement requirements may be made. A traceability matrix may be utilized to correspond the best practices and the engagement requirements. By having the best practices and engagement requirements concretely analyzed using a traceability matrix or other suitable technique, an objective standard may be applied by the consultant. The consultant may utilize the information to inform the client as to ramifications for using one practice over another. Ultimately, the consultant may provide a complete cross-referenced requirements specification, complete with best practices associated with each engagement requirement, to the client and be confident that a best practice may be replaced and understand effects that occur for such a replacement. While the principles of the present invention are suitable for implementation on a computing system, it should be understood that use of a computing system is optional for implementation.

Figure 1:
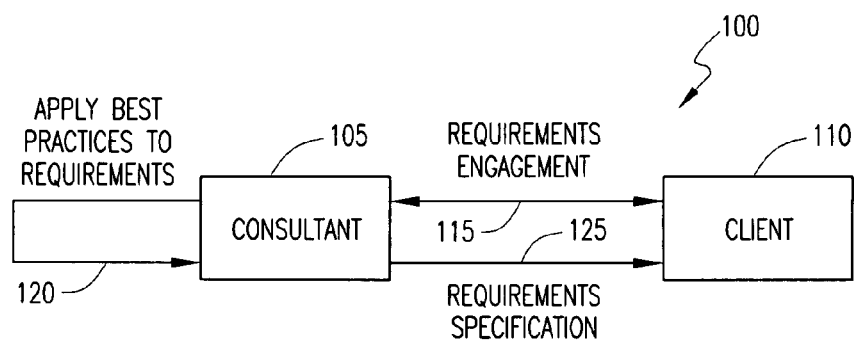
FIG. 1 is an exemplary block diagram identifying a business relationship between a consultant and client for developing a requirements engagement specification according to the principles of the present invention.

FIG. 1 is an exemplary block diagram 100 identifying a business relationship between a consultant 105 and client 110 for developing a requirements specification according to the principles of the present invention. In order to develop a requirements specification, a requirements engagement, which may include an audit or set of activities directed toward identifying client requirements for a project, is performed at 115. As understood in the art, engagement requirements remain substantially the same for any given requirements specification, however, the practices that are used to solve the requirements may change. As further understood in the art, a requirements specification is a document that provides requirements of a project, for example, and associated processes that satisfy the requirements.

One example of an engagement requirement of a project may be a requirement that the consultant 105 performing a role, such as a facilitator, eliciting requirements from the client 110 be subjected to being "politically sensitive." Being politically sensitive may simply mean to not conduct interviews with individuals of the client 110 without other interested individuals being present so as to avoid alienation, jealousy, or, pragmatically speaking, "talking behind the back of others." Three exemplary potential elicitation tools available to the consultant 105 include (i) joint application development, (ii) individual structured interviews, and (iii) client-authored examples. However, of the three, only the joint application development elicitation tool is politically sensitive as the joint application development organizes all interested individuals with the consultant 105 into a single meeting to discuss the requirements to be satisfied. The individual structured interviews approach has the consultant 105 conduct separate interviews with the interested individuals to discuss the engagement requirements. The client-authored examples may include no interviews with the interested individuals, and may simply be information provided to the consultant 105 by one or more individuals of the client 110.

Once engagement requirements of the requirements engagement 115 have been selected by the consultant 105 and the client 110, the consultant 105 applies practices or best practices to the engagement requirements of the requirements engagement at 120. The "best practices" refers to the practices that the consultant 105 deems to be best for satisfying requirements of the requirements engagement. To identify a best practice, the consultant 105 may, but is not limited to, use the following rules: (1) the practice is industry proven, (2) the consultant 105 has successfully used the practice for other matters, and (3) the client 110 uses the practice and the consultant 105 recognizes the practice to be applicable and valid for at least one satisfying engagement requirement. Upon the consultant 105 applying best practices to the requirements engagement, the consultant may produce a deliverable, the form of which may also be identified as a best practice that satisfies engagement requirements, to the client 110 at 125.

Figure 2:
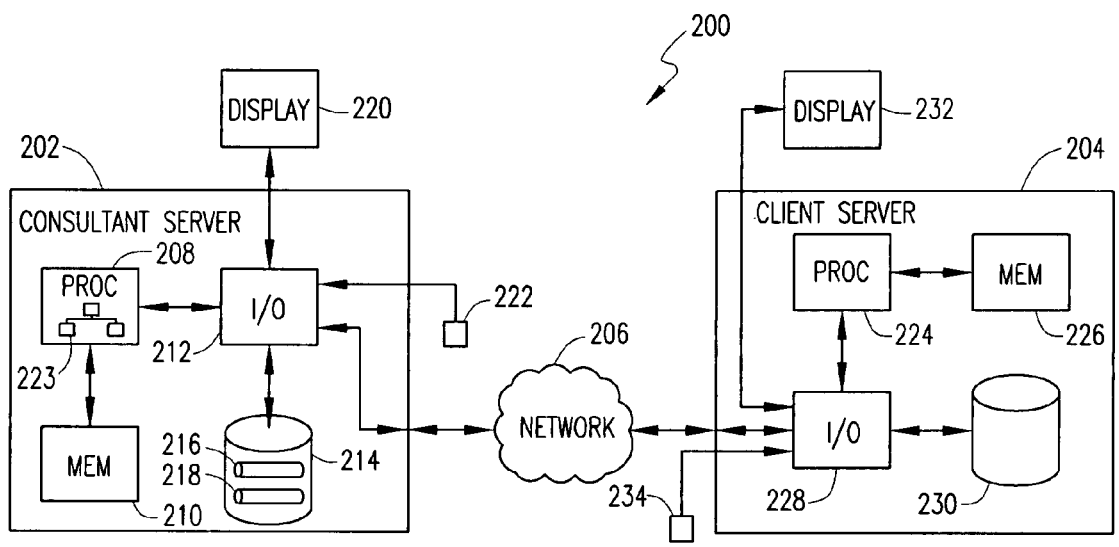
FIG. 2 is an exemplary block diagram of a computing system for operating and managing the best practice delivery system of FIG. 1.

FIG. 2 is an exemplary block diagram of a system 200 for applying the principles of the present invention according to FIG. 1. A consultant server 202 communicates with a client server 204 via a network 206. The consultant server includes a processor 208 coupled to a memory 210 and an I/O unit 212. A storage unit 214 is further coupled to the I/O unit 212. Two repositories or databases 216 and 218 may be stored on the storage unit 214, where a first database 216 may store best practices of the consultant 105, and a second database 218 may store one or more requirement engagements prepared by the consultant 105. Other databases, such as a roles database, may further be stored on the storage unit 214. A display 220 may further be coupled to the consultant server 202 via the I/O unit 212 to display the contents of the databases 216 and 218 for the consultant 105. A control device 222 may be utilized by the consultant 105 in generating the requirements specification. Software 223 stored in the storage unit 214 and executable on the processor 208 may be used to apply best practices of the consultant 105 to the engagement requirements, for example.

The client server 204 includes a processor 224 coupled to a memory 226 and an I/O unit 228. A storage unit 230 may be coupled to the I/O unit 228. A display 232 may be coupled to the client server 204 via the I/O unit 228. A control device 234 may be coupled to the I/O unit 228 and operable to control operation of the client server 204.

Figure 3:
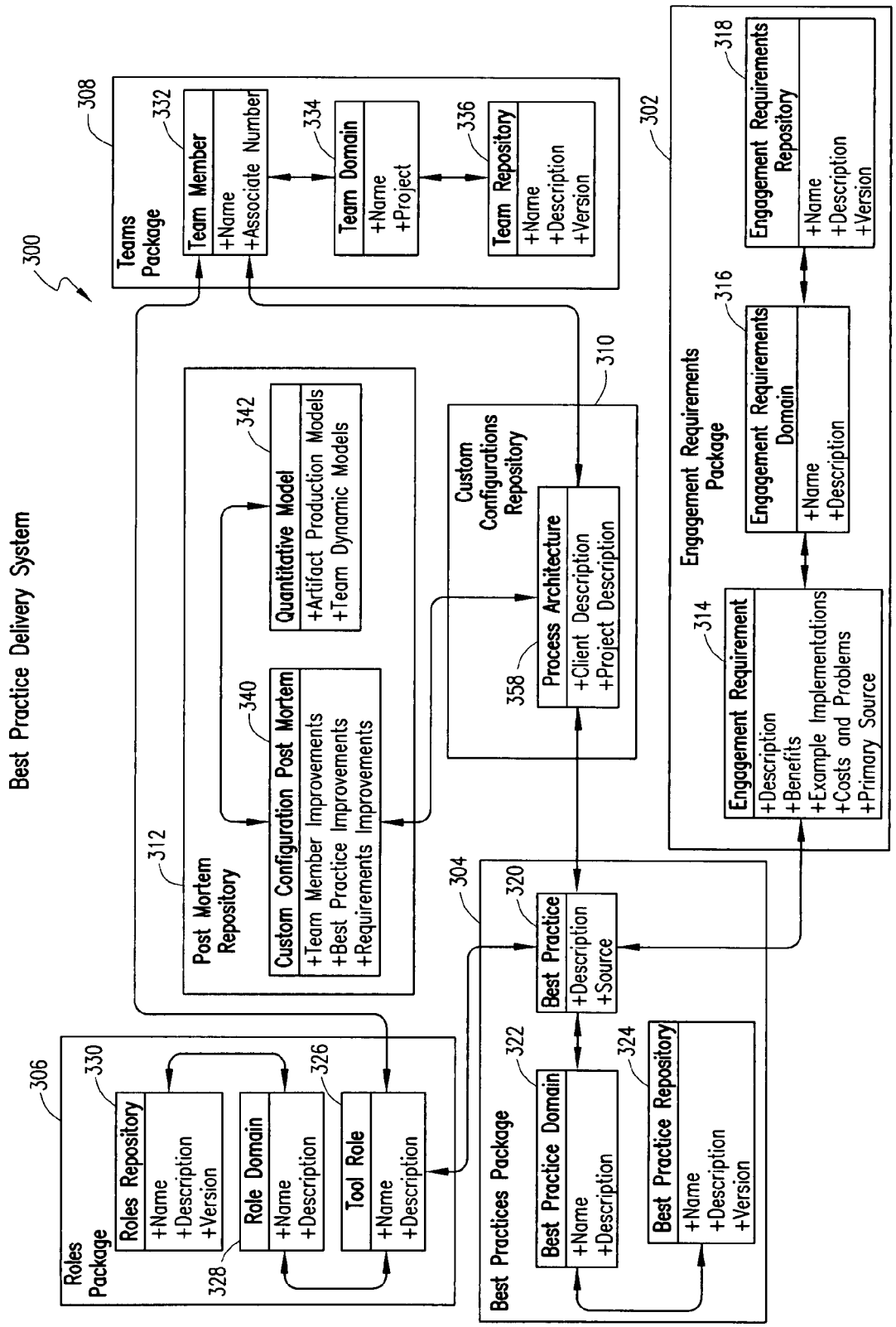
FIG. 3 is an exemplary block diagram of a best practice delivery system as utilized by the consultant of FIG. 1.

FIG. 3 is an exemplary best practice delivery system 300 that may be operated by the consultant server 202. The best practice delivery system 300 may be utilized to apply best practices to engagement requirements so as to produce a requirements specification for the client 110. Additionally, the best practice delivery system 300 may be utilized to change practices as applied to the engagement requirements and objectively determine the ramifications that may be created based on changing either the engagement requirements or best practices as applied to the engagement requirements.

The best practice delivery system 300 includes a number of modules, including (i) a process requirements package 302, (ii) a best practices package 304, (iii) a roles package 306, (iv) a teams package 308, (v) a custom configurations repository 310, and (vi) a post mortems repository 312. The modules may be implemented in the software 223 and executed by the processor 208. It should be understood, however, that the best practice delivery system 300 might simply be tools used by the consultant 105 and not performed on a computing system.

The process requirements package 302 is utilized to detail requirements that the consultant 105 determines to be effective for subsequent requirement engagements. The process requirements enable the consultant 105 to use different processes for different clients 110, while still providing a base foundation of quality. The process requirements package 302 includes process or engagement requirements 314, engagement requirements domain 316, and an engagement requirements repository 318. The engagement requirements 314 may include data, such as a description, benefits, example implementations, cost and problems, and primary sources, for example. The engagement requirements domain 316 may include name and description of engagement requirements data. The process requirements repository 318 is utilized to store the engagement requirements 314 and engagement requirements domain 316.

The best practices package 304 is utilized to maintain the best practices identified by the consultant 105 to be applied to the engagement requirements 314. Each of the best practices maintained by the best practices package 304 satisfies one or more requirements in the engagement requirements repository 318. The best practices package 304 includes best practices 320, best practices domain 322, and best practice repository 324. The best practices 320 include a description and source for each of the best practices. The description of a best practice describes the best practice, and the source may include one or more reference materials, such as an article or book, that discusses the best practices and implementations thereof. The best practice domain 322 includes name and description of the best practices. The best practices repository 324 stores the best practices that the consultant 105 uses for the requirements engagements for which the consultant is involved.

The roles package 306 includes a tool role 326, role domain 328, and roles repository 330. The tool role 326 includes the name and description of the roles that individuals of the consultant 105 may play to satisfy the best practice for an engagement requirement. Additionally, the tool role 326 includes ratings of individuals performing roles. For example, an individual may be highly rated as a facilitator, but poorly rated as a scribe. The role domain 328 includes the name and description of the roles for the consultant 105 to identify for each of the individuals playing the roles. The roles repository 330 stores the roles that the consultant uses for the requirements engagements, where each of the roles maps to one or more best practices in the best practice repository 324.

The teams package 308 is utilized to maintain an identification of the team members that satisfy particular roles for the requirements engagements that the consultant 105 has engaged. The teams package 308 includes team members 332, team domain 334, and a team repository 336. The team members 332 include a name and associate number to identify an individual of the consultant 105. The team domain 334 includes a name and project with which team members have been involved in the past. The team repository 336 stores a description of the team members of the consultant 105, where each of the team members is related to the roles stored in the roles repository that the team members have played in previous requirements engagements.

The custom configurations repository 310 stores custom configurations that have previously been built by the consultant 105. A custom configurations 338 includes client and project descriptions and describes the combination of the best practices from the best practices repository 324 and individuals of the consultant 105 from the teams repository 336 that the consultant 105 identifies as being effective for a specific requirements engagement in order to meet engagement requirements.

The post mortems repository 312 includes a custom configuration post mortem 340 and a quantitative model 342. The custom configuration post mortem 340 includes team member improvements, best practice improvements, and requirements improvements. The quantitative model 342 includes artifact production and team dynamic models for quantitatively determining or assessing team members, best practices, and requirements. Techniques as provided in co-pending U.S. patent application Ser. No. 09/760,339 filed Jan. 12, 2001 and U.S. patent application Ser. No. 09/916,088 filed Jul. 26, 2001, which are incorporated herein by reference, may be utilized to objectively assess progress of the engagement and analyzing interdependencies between the project team members. Results of analyses may be utilized to develop metrics indicative of the effectiveness of the practices and associates performing the roles. Such metrics may include ratings, such as letter or number grades, of the ability of an individual to perform a particular role and the ability for a practice to satisfy a particular engagement requirement. The metrics may be objectively determined based on either a statistical computation technique or subjectively determined based on a questionnaire provided by the consultant 105. However, whether objectively or subjectively determined, the metrics may be utilized by the consultant 105 to objectively determine which practices and associates best satisfy the needs of the requirements engagement. The post mortem repository 312 closes the loop on the best practice delivery system 300, thereby enabling the consultant to objectively assess the ability of the individuals and best practices identified in the process architecture 338 and custom configurations repository 310. The post mortems stored in the post mortem repository 312 may include qualitative assessments of quantitative models.

It should be understood that the best practice delivery system may be a combination of software elements using object oriented programming or other programming techniques for implementing the best practice delivery system. The repositories may be databases that are maintained by database software programs as understood in the art. By the consultant 105 expressly setting forth engagement requirements and best practices that satisfy the engagement requirements, the consultant 105 is able to apply the best practices to requirements engagements in an objective manner and be ensured that each of the engagement requirements are satisfied. Additionally, by maintaining roles, each of the best practices may be satisfied by individuals who best fill particular roles.

Although not shown in the best practice delivery system 300, implicit is at least one traceability matrix operable to identify or associate best practices with engagement requirements. Additionally, a traceability matrix may be utilized to associate roles with best practices. By utilizing a traceability matrix, the consultant 105 may easily and objectively determine relationships between best practices and engagement requirements to determine whether a requirement engagement may be satisfied by a particular best practice. And, in the case of a client 110 changing an engagement requirement during the engagement process, the consultant 105 may quickly determine whether the same or a different best practice satisfies the new engagement requirement.

In practice, a content management system, such as Telelogic's DOORS® system, may be utilized to perform the traceability matrix operations. The content management system may operate as an interactive electronic document that provides a user with the ability to review the document and selectively access associated information of a particular engagement requirement, for example, by selecting a hyperlink or other soft button. Alternatively, the traceability matrix may be a table, such as a spreadsheet, that provides a cross-reference between the practices and engagement requirements.

Figure 4:
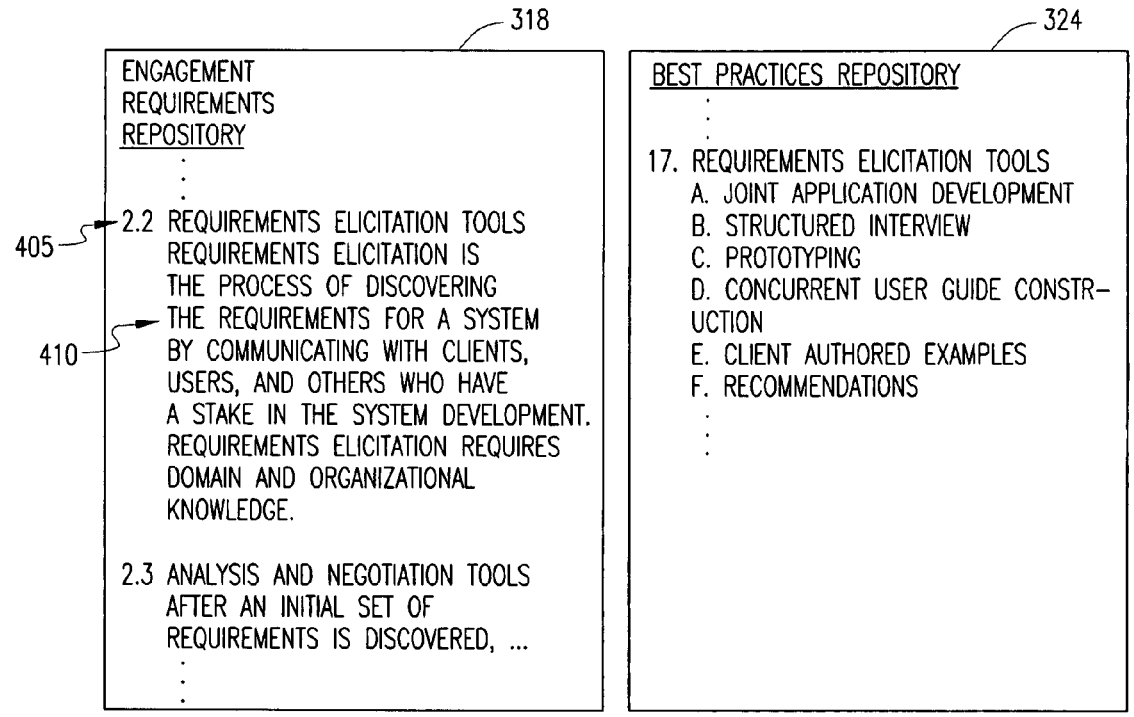
FIGS. 4A-4C are exemplary repositories providing for engagement requirements, best practices, and a traceability matrix according to FIG. 3.

FIGS. 4A-4C are exemplary repositories providing for engagement requirements, best practices, and a traceability matrix. FIG. 4A is an exemplary portion of an engagement requirements repository 318 that includes engagement requirements. As shown, section 2.2 includes a heading 405, "Requirements Elicitation Tools," and a description 410 of the heading 405. The engagement requirements repository 318 may include all of the engagement requirements that the consultant 105 deems to be available for a complete requirements engagement.

FIG. 4B provides an exemplary portion of a best practices repository 324 which may include all of the best practices that the consultant deems capable of providing solutions to the engagement requirements stored in the engagement requirements repository 318. As shown, there are many processes (A-F) that are capable of solving the requirements elicitation tools requirement. Depending upon the needs or desire of the client 110 for fulfilling the requirements elicitation tool, the consultant 105 may select one or more of the processes presented.

FIG. 4C provides an exemplary portion of a traceability matrix. A table linking section 2.2 of the engagement requirements repository 318 and section 17.A of the best practices repository. Alternatively, rather than using indicia applied to a table to represent engagement requirements and best practices, other techniques may be used, such as hyperlinks or actual text of the different sections. As understood in the art, a content management system providing traceability matrix capabilities may be utilized to perform associations of the best practices to the engagement requirements. Although not shown, a requirements specification may include the associated engagement requirements and best practices in a single document or repository.

Figure 5:
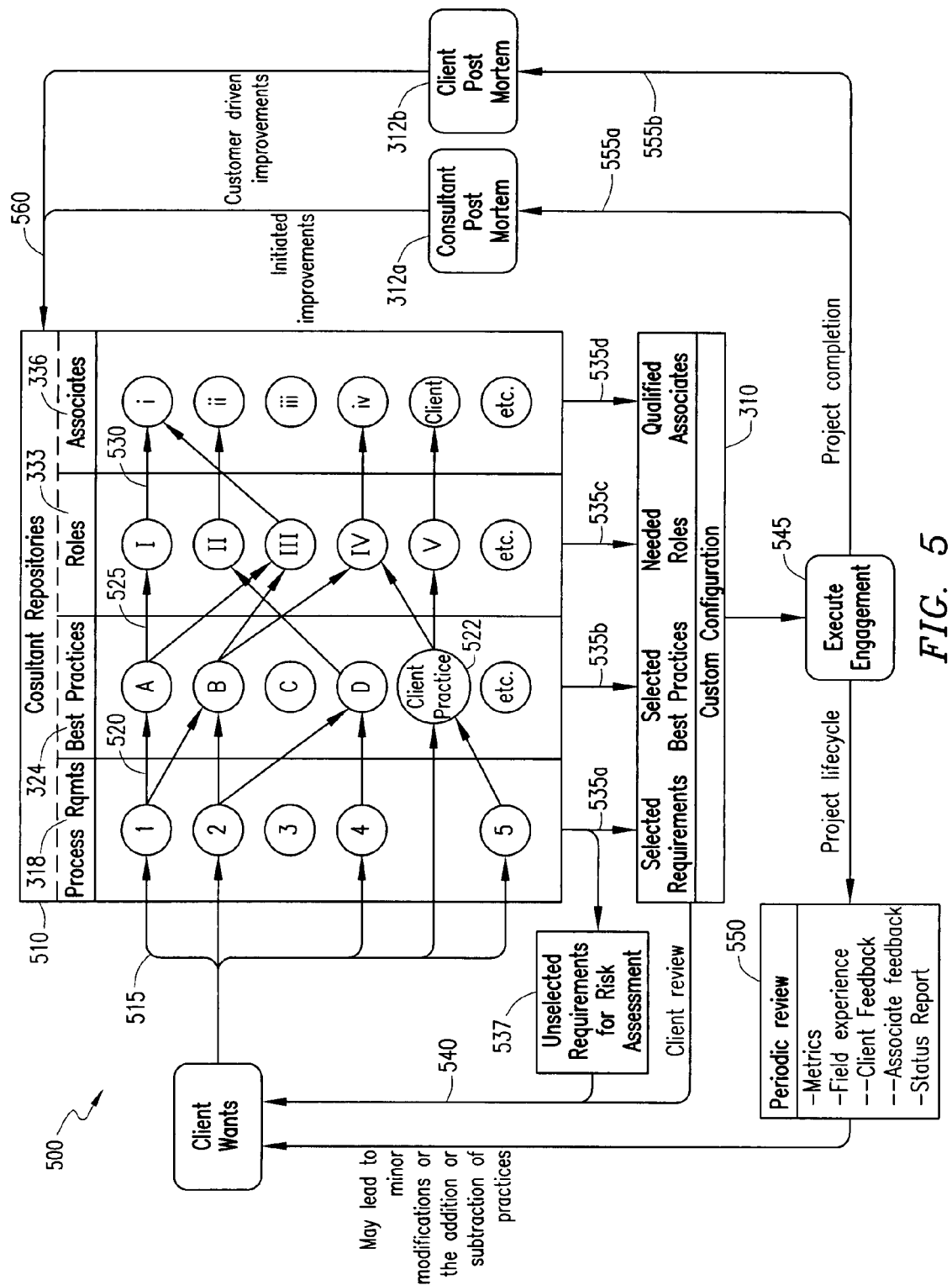
FIG. 5 is an exemplary block diagram including modules of FIG. 3 for applying the principles of the present invention in developing a requirements specification by the consultant of FIG. 1.

FIG. 5 is an exemplary block diagram 500 including modules of FIG. 3 for applying the principles of the present invention in developing a requirements specification by the consultant 105. The process begins at 505 to determine the wants of the client 105 in terms of the engagement or process requirements 318 from the consultant repositories 510. At 515, the client 105 selects particular engagement or process requirements (e.g., 1, 2, and, 4), such as requirement elicitation tools, to be satisfied. If the client desires the requirement elicitation tool to be politically sensitive, then the consultant objectively selects at 520 practice A, which may be the joint application development practice, for example, from the best practices repository 324. Alternatively, the consultant 105 may select a client practice 522 to perform an engagement requirement (e.g., 5). Once it is determined that the A practice is to be utilized, the consultant 105 determines roles (I)-(V), such as a facilitator, that are to be used to perform the A practice from the roles repository 333 at 525. At 530, an objective determination is made to select personnel or associates (i)-(iv) from the team repository 336 to perform the particular role.

The selected requirements, practices, roles, and associates are stored at 535a-535d, respectively, for a particular project comprises a custom configuration 310. The custom configuration 310 and unselected requirements for risk assessment 537 are fed back for client review at 540. The client 105 may review the custom configuration 310 at this point and ask questions and/or make changes. Once the client 105 has accepted the recommendations of the consultant 110, the engagement is executed at 545. A periodic review of the engagement is conducted at 550 and, again, fed-back to allow the client to ask questions and/or make changes to the ongoing engagement. If the client does want to make a change to one of the engagement requirements or practices during the engagement, the value of using the principles of the present invention becomes clear as the consultant is quickly and easily able to objectively determine the ramifications that making a particular change causes, including any requirement that may not be met or any role that may not be needed. Post mortems 312a and 312b (collectively 312) may also be conducted during the execution of the engagement at 555. By conducting post mortems 312 during the engagement, the consultant 105 may objectively monitor the execution of the engagement and develop a list of improvements to be applied at 560 to the data in the consultant repositories 510. Additionally, by monitoring the engagement, the consultant 105 may determine that a particular associate is unsuccessful in performing a certain role and replace that associate with another, more effective associate at 560.

The previous description is of an embodiment for implementing the principles of the present invention, and the scope of the invention should not necessarily be limited by this description. The scope of the present invention is instead defined by the following claims.

What is claimed is:

1. A method for developing a requirement specification by a consultant for a client, said method comprising:
   communicating with the client by the consultant to determine a set of engagement requirements deemed to be important to the client;
   selecting a corresponding set of practices to be applied to the set of engagement requirements;
   determining, using a traceability matrix, whether the set of practices satisfies the set of engagement requirements;
   generating the requirement specification including the set of engagement requirements and best practices;
   performing post mortems for allowing the consultant to develop a list of best practice improvements during a project;
   wherein said traceability matrix is adapted to determine relationships between said best practices and said set of engagement requirements to determine whether said set of engagement requirements are satisfied by said best practices;
   wherein said step of determining is based upon objective standards by concretely analyzing said set of practices and said set of engagement requirements to determine that said best practices satisfy said set of engagement requirements; and wherein the steps of communicating, selecting, determining, generating, and performing are performed over a computer network.

2. The method according to claim 1, further comprising delivering the requirements specification to the client.

3. The method according to claim 1, further comprising identifying roles to engage the practices.

4. The method according to claim 3, further comprising selecting personnel to perform the identified roles.

5. The method according to claim 4, further comprising selecting training material listed for the practices for the personnel selected to perform the identified roles upon determining that the experience or skill levels of the personnel is deficient with respect to the practice.

6. The method according to claim 1, wherein said selecting is based on statistical analysis.

7. The method according to claim 1, further comprising developing metrics indicating effectiveness of the set of practices.

8. The method according to claim 7, wherein the set of metrics include ratings, wherein the ratings provides an indication of a strength of the set of practices to satisfy the set of engagement requirements.

9. The method according to claim 7, wherein the metrics are utilized by the consultants to determine which of the set of practices satisfy the set of engagement requirements.

10. The method according to claim 1, further comprising performing post mortems for allowing the consultant to develop a list of engagement requirement improvements during the project.

11. A system for generating a requirements specification operable to define scope of a project, said system comprising:

a first data repository including requirements defining problems to be solved for the project;

a second data repository including practices defining solutions to the requirements;

a traceability matrix correlating the requirements and a set of practices that satisfy the requirements, a combination of the requirements and set of practices forming a requirements specification;

a post mortem repository;

wherein the post mortem repository includes qualitative assessments of quantitative models;

wherein the qualitative assessments of the quantitative models allow a consultant to develop a list of best practice improvements during the project;

wherein said traceability matrix is adapted to determine relationships between best practices and said requirements to determine whether said requirements are satisfied by said best practices; and wherein said relationships between said best practices and said requirements are based upon objective standards by concretely analyzing said practices and said requirements to determine that said best practices satisfy said requirements.

12. The system according to claim 11, wherein said traceability matrix is maintained by a content management system.

13. The system according to claim 11, wherein said second data repository further includes identifiers associated with each of the best practices for indicating requirements satisfied by the best practices.

14. The system according to claim 13, wherein said computing system includes a processor operable to manage said traceability matrix.

15. The system according to claim 11, further comprising a computing system having a storage medium coupled thereto, the storage medium having said first and second data repositories stored thereon.

16. A method for analyzing effectiveness of practices applied to a requirements specification, said method comprising:

identifying, using a traceability matrix, a practice applied to a requirement, the practice defining a solution to satisfy the requirement;

associating at least one metric to the practice based on effectiveness of the practice to satisfy the requirement;

storing the practice and associated at least one metric in a data repository;

utilizing the at least one metric and the practice to generate the requirement specification;

performing post mortems for allowing a consultant to develop a list of best practice improvements during a project;

wherein said traceability matrix is adapted to determine relationships between best practices and said requirement to determine whether said requirement is satisfied by said best practices;

wherein said relationship between said best practices and said requirement is based upon objective standards by concretely analyzing said practices and said requirement to determine that said best practices satisfy said requirement; and wherein the steps of identifying, associating, storing, utilizing, and performing are performed over a computer network.

17. The method according to claim 16, further comprising:

identifying an individual to perform a role associated with the practice; and associating at least one metric with the practice based on effectiveness of the individual to perform the role.

18. The method according to claim 16, wherein the data repository is a database located on a memory storage medium.

19. A method for generating a requirements engagement to a client from a consultant for a given project, said method comprising:

identifying, based on communication between the consultant and client, a set of engagement requirements to be satisfied for the given project;

receiving a first set of practices desired to be utilized by the client to satisfy at least one engagement requirement of the set of engagement requirements;

determining, using a traceability matrix, whether the first set of practices satisfies the at least one engagement requirement;

applying, using said traceability matrix, a second set of practices to engagement requirements not satisfied by the first set of practices;

forming a third set of practices from the first and second set of practices utilized to satisfy the identified set of requirements, the third set of practices being identified as practices that satisfy the set of engagement requirements of the given project;

performing post mortems for allowing the consultant to develop a list of best practice improvements during the project;

wherein said step of forming is based upon objective standards by concretely analyzing said first and second set of practices and said engagement requirements to determine that said third set of practices satisfy said engagement requirements; and wherein the steps of identifying, receiving, determining, applying, and forming are performed over a computer network.

20. The method according to claim 19, further comprising forming a set of roles associated with the set of engagement requirements to perform the engagement requirements.

21. The method according to claim 20, further comprising assigning personnel to perform the set of roles.

* * * * *